(12) United States Patent
Graham

(10) Patent No.: US 7,101,417 B2
(45) Date of Patent: Sep. 5, 2006

(54) ACTIVATED CARBON FOR ODOR CONTROL AND METHOD FOR MAKING SAME

(75) Inventor: James R. Graham, Fountain Valley, CA (US)

(73) Assignee: USFilter Corporation, Warrendale, PA (US)

( * ) Notice: Subject to any disclaimer, the term of this patent is extended or adjusted under 35 U.S.C. 154(b) by 199 days.

(21) Appl. No.: 10/729,274

(22) Filed: Dec. 5, 2003

(65) Prior Publication Data
US 2004/0112214 A1    Jun. 17, 2004

Related U.S. Application Data

(60) Provisional application No. 60/431,073, filed on Dec. 5, 2002.

(51) Int. Cl.
*B01D 53/04* (2006.01)
*B01D 53/48* (2006.01)

(52) U.S. Cl. .............................. 95/136; 95/901; 96/153; 96/154; 423/230; 428/408; 502/183; 502/417

(58) Field of Classification Search .......... 95/135–137, 95/139, 901; 96/108, 153, 154; 423/230; 428/408; 502/416, 418, 182, 183, 417
See application file for complete search history.

(56) References Cited

U.S. PATENT DOCUMENTS

| | | | |
|---|---|---|---|
| 2,822,304 A | 2/1958 | Gillmore et al. | |
| 3,416,293 A | 12/1968 | Alexander | |
| 3,817,874 A | 6/1974 | Wennerberg et al. | |
| 4,008,174 A | 2/1977 | Jacobson et al. | |
| 4,125,482 A | 11/1978 | Sinha | |
| 4,242,226 A | 12/1980 | Siren | |
| 4,252,571 A | 2/1981 | Reilly | |
| 4,447,665 A | 5/1984 | Wennerberg | |
| 4,482,641 A | 11/1984 | Wennerberg | |
| 4,518,488 A | 5/1985 | Wennerberg | |
| 4,795,735 A * | 1/1989 | Liu et al. ............. | 502/415 |
| 4,831,003 A | 5/1989 | Lang et al. | |
| 4,938,046 A | 7/1990 | Kodama et al. | |
| 4,970,189 A | 11/1990 | Tachibana | |
| 4,978,650 A | 12/1990 | Coughlin et al. | |
| 5,037,791 A | 8/1991 | Comolli et al. | |
| 5,063,196 A * | 11/1991 | Doughty et al. ...... | 423/240 R |
| 5,260,047 A | 11/1993 | Berger | |
| 5,356,849 A | 10/1994 | Matviya et al. | |
| 5,480,860 A | 1/1996 | Dillon | |
| 5,486,356 A | 1/1996 | Yim | |
| 5,486,410 A * | 1/1996 | Groeger et al. ....... | 442/353 |
| 5,488,023 A | 1/1996 | Gadkaree et al. | |
| 5,492,882 A | 2/1996 | Doughty et al. | |
| 5,494,869 A | 2/1996 | Hayden et al. | |
| 5,598,868 A | 2/1997 | Jakob et al. | |
| 5,658,372 A * | 8/1997 | Gadkaree ............. | 95/116 |
| 5,703,003 A * | 12/1997 | Siriwardane .......... | 502/400 |
| 5,750,026 A * | 5/1998 | Gadkaree et al. ..... | 210/502.1 |
| 5,948,398 A * | 9/1999 | Hanamoto et al. .... | 424/76.1 |
| 5,997,829 A | 12/1999 | Sekine et al. | |
| 5,998,328 A * | 12/1999 | Dawes et al. ........ | 502/182 |
| 6,010,666 A | 1/2000 | Kurokawa et al. | |
| 6,136,749 A * | 10/2000 | Gadkaree et al. ..... | 502/183 |
| 6,187,713 B1 * | 2/2001 | Gadkaree ............. | 502/425 |
| 6,193,877 B1 * | 2/2001 | McVicker et al. ..... | 208/217 |
| 6,228,802 B1 * | 5/2001 | Scranton et al. ...... | 502/401 |
| 6,228,803 B1 * | 5/2001 | Gadkaree et al. ..... | 502/416 |
| 6,248,691 B1 * | 6/2001 | Gadkaree et al. ..... | 502/423 |
| 6,251,822 B1 * | 6/2001 | Peng et al. ........... | 502/423 |
| 6,258,334 B1 * | 7/2001 | Gadkaree et al. ..... | 423/210 |
| 6,277,179 B1 * | 8/2001 | Reymonet ............ | 96/153 |
| 6,858,192 B1 | 2/2005 | Graham et al. | |

FOREIGN PATENT DOCUMENTS

| | | |
|---|---|---|
| EP | 0568003 A2 * | 11/1993 |
| EP | 0643014 | 3/1995 |
| EP | 0747118 | 12/1996 |
| FR | 2389381 | 12/1978 |
| JP | 54 046210 A | 4/1979 |
| JP | 7313867 | 12/1995 |
| JP | 9192485 | 7/1997 |
| WO | WO 91/02579 | 3/1991 |
| WO | WO 02/48032 A2 | 6/2002 |

OTHER PUBLICATIONS

Japanese Abstract No. 2078433, Dainichiseika Color & Chemical Mfg.; Mar. 19, 1990.
Japanese Abstract No. 9192485, Kuraray Chemical Co., LTD.; Jul. 29, 1997.
Japanese Abstract No. 7313867, Matushita Electric Works LTD.; Dec. 5, 1995.
International Search Report PCT/US 01/47641; dated Jul. 11, 2002.
Calgon Carbon Corporation, Type Cane CAL Granular Carbon, Bulletin 23-76a, 1987.
Soo-Jin Park and Woo-Young Jung, Influence of Activation Temperature on Micro- and Mesoporosity of Synthetic Activated Carbons, vol. 2, Jun. 2001, pp. 105-108.

(Continued)

*Primary Examiner*—Frank M. Lawrence

(57) ABSTRACT

An activated carbon/metal oxide filter element is disclosed. The filter element may be prepared by blending an activated carbon, a metal oxide, and a binder to form a filter media mixture, shaping the filter media mixture into a filter body. The filter body may be calcined to form a filter element. The activated carbon/metal oxide filter element may be used to remove odorous compounds, acidic gases, and volatile organic compounds from a gas.

56 Claims, 3 Drawing Sheets

OTHER PUBLICATIONS

Webster's New Collegiate Dictionary (1979), G.&C. Merriam Company, pp. 404, 632, 1979.

International Search Report, PCT/US 03/38504, dated Oct. 20, 2004.

* cited by examiner

ACTIVATED CARBON FOR ODOR CONTROL AND METHOD FOR MAKING SAME

This application claims priority to co-pending U.S. Provisional Application Ser. No. 60/431,073, titled: ACTIVATED CARBON FOR ODOR CONTROL AND METHOD FOR MAKING SAME, filed Dec. 5, 2002, which is incorporated herein by reference for all purposes.

BACKGROUND

1. Field of the Invention

This invention relates generally to an activated carbon for odor control and methods for making same and, more particularly, to an activated carbon, metal oxide filter element to control odor in a gaseous stream and methods of making same.

2. Description of Related Art

Activated carbons have long been known for their capacity to sorb odors. Activated carbons capture substances generally through physical sorption, chemical sorption and catalytic reaction. It is well known that the presence of metals in activated carbon can enhance the efficiency and selectivity of the activated carbon in sorptive or filtering applications. Methods for producing porous structural materials containing adsorbent particles of activated carbon and metals or metal oxides are conventionally known.

Activated carbon impregnated with metals are typically formed by dispersing activated carbon powders in a solution of a metal salt. The powder is filtered out, dried, and heated to decompose the salt to the desired metal or metal oxide catalyst. Multiple impregnations are usually required to obtain the desired quantity of catalyst on the activated carbon.

Other methods of forming activated carbons are disclosed in U.S. Pat. No. 4,242,226, to Siren; U.S. Pat. No. 4,970,189 to Tachibana; in U.S. Pat. No. 5,488,023, to Gadkaree et al.; U.S. Pat. No. 5,997,829 to Sekine et al.; U.S. Pat. No. 4,482,641 to Wennerberg; U.S. Pat. No. 4,831,003 to Lang et al.; and U.S. Pat. No. 5,948,398 to Hanamoto et al.

SUMMARY

In one aspect of the invention is a method of preparing a filter element comprising blending an activated carbon, a metal oxide, and a binder to form a filter media mixture, shaping the filter media mixture to form a filter body, and calcining the filter body to form the filter element.

Another aspect of the invention is directed to a method of reducing a concentration of an odorous compound in a gaseous stream comprising forming an activated carbon/metal oxide filter element constructed and arranged to exhibit a structural failure when saturated with the odorous compound, contacting the gaseous stream with the filter element such that the odorous compound is sorbed on the filter element to purify the gaseous stream, and removing the gaseous stream from the filter element.

Another aspect of the invention is directed to a method of reducing a concentration of hydrogen sulfide present in a gaseous discharge comprising contacting the gaseous discharge with an activated carbon/metal oxide filter element constructed and arranged to exhibit a structural failure when saturated with sulfur, thereby producing a product stream having a reduced hydrogen sulfide concentration, and removing the product stream from the activated carbon/metal oxide filter element.

Another aspect of the invention is directed to a filter element comprising an activated carbon, a metal oxide, and a fibrous binder having an aspect ratio of between and including about 500:1 and about 700:1.

Another aspect of the invention is directed to a method of preparing a filter element comprising blending an activated carbon, metal oxide, and binder to form a filter media mixture, shaping the filter media mixture to form a filter body, and drying the filter body to form a filter element having a moisture content of about 5 weight percent to about 15 weight percent.

Other advantages, novel features, and objects of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

BRIEF DESCRIPTION OF THE DRAWINGS

Preferred non limiting embodiments of the present invention will be described by way of example with reference to the accompanying drawings, in which.

DETAILED DESCRIPTION

Figure 1:
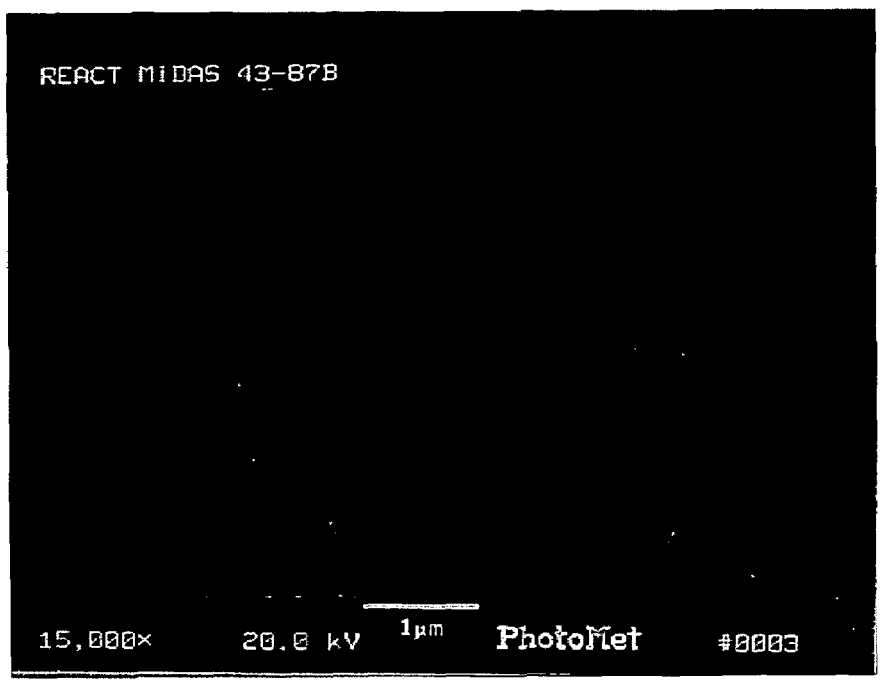
FIG. 1 is a 15,000×SEM photograph of an activated carbon, metal oxide filter element of the present invention.

The present invention provides an activated carbon, metal oxide filter element and methods of making and using same. Activated carbon is a porous material characterized by a high carbon content and a large surface area, and is typically a mixture of amorphous carbon and graphite crystals, rather than a homogeneous, well defined material. The term "activated carbon" generally refers to a black, solid carbonaceous material, such as charcoal, bone charcoal, sugar charcoal, carbon produced from oil products, coconut carbon, and the like, that remains after the decomposition of organic material by pyrolysis, and undergoes an activating process, during or after the pyrolysis. Activation is typically done by known methods such as exposing the structure to an oxidizing agent such as steam, carbon dioxide, metal chloride (e.g. zinc chloride), phosphoric acid, or potassium sulfide, at high temperatures. Temperatures sufficient for activation generally range from about 800° C. to about 1000° C. (1450° F. to 1850° F.). Activation creates a high surface area and in turn imparts high adsorptive capability to the structure.

The activated carbon/metal oxide filter element according to the present invention, may be prepared, in general, by mixing an activated carbon, a metal oxide, and a binder to form a filter media mixture and shaping the filter media mixture to form a filter body. The filter body may be calcined to form a filter element.

As used herein, "calcine" is defined as to heat a substance to a high temperature but below the melting or fusing point, causing loss of moisture, reduction or oxidation, and the decomposition of carbonates and other compounds. In one embodiment, the temperature for calcination is less than the burning temperature of activated carbon, typically about 450° C. Calcination is typically carried out under atmospheric conditions at a sufficient temperature and time to form a moisture resistant filter element. Temperature and time for adequate calcination depend on a variety of factors, such as the thickness of the layer of material to be calcined, In one embodiment, the filter body may be calcined at temperatures between about 150° C. and about 400° C., for about 15 minutes to about 3 hours, under atmospheric conditions. In another embodiment, the filter body may be calcined at about 300° C. for about 0.5 hour to about 3 hours. In a preferred embodiment, the filter body is calcined at 300° C. for about 1.5 hours.

The activated carbon may be prepared from any carbon material, so long as it results in a porous carbon material when heated in a non oxidizing condition. For example, carbon materials usable in the present invention include: charcoal, coconut shell, bone charcoal, sugar charcoal, coal and other conventional carbon materials. In one embodiment the activated carbon is a reactivated activated carbon. As used herein, the phrase, "reactivated activated carbon" includes spent activated carbon, or activated carbon that has been removed from service because it is reaching or has reached the end of its useful sorptive life, and has subsequently been reactivated as is known in the art. The activated carbon may be granular or powder and may be crushed prior to mixing with the metal oxide. The activated carbon may be ground to a powder. As used herein, the term "powder" is defined as a loose grouping or aggregation of solid particles having a diameter smaller than about 1 mm. Alternatively, the activated carbon may be ground to granules. As used herein, the term "granule" is defined as a loose grouping or aggregation of solid particles having a diameter from about 1 mm to about 4 mm, preferably from about 1 mm to about 2 mm. The activated carbon may be ground by any means known in the art, such as in a pendulum type-4 ring roll pulverizer utilizing centrifugal force to pass the carbon mixture through a mesh. In one embodiment, the carbon mixture is ground and, if necessary, reground so that approximately 90% of the carbon mixture passes through a 100 mesh. In a preferred embodiment, a powdered activated carbon is used.

Any metal oxide that enhances the sorptive capacity of activated carbons may be used in the present invention. As used herein, the term "sorb" is defined as the capture of substances generally through physical sorption, chemical sorption and catalytic reaction. Metal oxides usable in the present invention include metal oxides selected from the group consisting of the oxides of Ca, Mg, Ba, Be, Sr, Sc, Y, La, Lanthanide Series, Ti, Zr, Hf, V, Nb, Ta, Cr, Mo, W, Mn, Fe, Co, Ni, Cu, Zn, and combinations thereof. In another embodiment, the metal oxide is selected from the oxides of alkaline earth metals. In a preferred embodiment, the metal oxide is selected from the oxides of Mg, Ca, and Ba. In a more preferred embodiment, the metal oxide is magnesium oxide. The metal oxide may be in any form, such as, for example, granules or powder. The metal oxide in powder form may be of any size and have any size distribution. In a preferred embodiment, the metal oxide powder is about 200 mesh, and more preferably about 325 mesh or finer. In one embodiment, the metal oxide has been manufactured using a combination of precipitation and calcinations conditions yielding a low density (light) metal oxide before being mixed with the activated carbon. As used herein, "light" is used to define a low density metal oxide. In a preferred embodiment, the metal oxide is manufactured in a way to yield a density (heavy) metal oxide prior to mixing with the activated carbon. As used herein, the phrase "heavy" is used to define a high density magnesium oxide.

In one embodiment, the activated carbon, metal oxide, and binder are mixed. In another embodiment, the activated carbon and metal oxide are mixed to form a dry mixture prior to mixing with a binder. Generally, metal oxide at about 3% to about 15% by weight of the filter media mixture is mixed with the activated carbon. In one embodiment, metal oxide at about 5% to about 10% by weight of the filter media mixture is mixed with the activated carbon. In a preferred embodiment, the filter media mixture comprises about 15% by weight of the metal oxide.

The binder may be any known material capable of binding the activated carbon and metal oxide without penetrating a significant number of pores in the activated carbon. The binder may be an organic material. In one embodiment, the binder may have a fibrous shape that may form a porous structure when binding with itself, and/or with the activated carbon and metal oxide. In one embodiment, a binder is a fiber having an aspect ratio of about 500:1 or greater. In a preferred embodiment, the fibrous binder has an aspect ratio of between about 500:1 and about 700:1, inclusive. In another embodiment, the binder may be an inorganic material. For example, the binder may be magnesium alumino silicate, silica sol, alumina sol, and combinations thereof. In a preferred embodiment, the binder is magnesium aluminasilicate such as that commercially available from Floridin, under the name Acti-Gel™ 208. The binder may comprise about 5–15% by weight of the filter element. In one embodiment, the binder comprises about 10% by weight of the filter element.

Figure 2A:
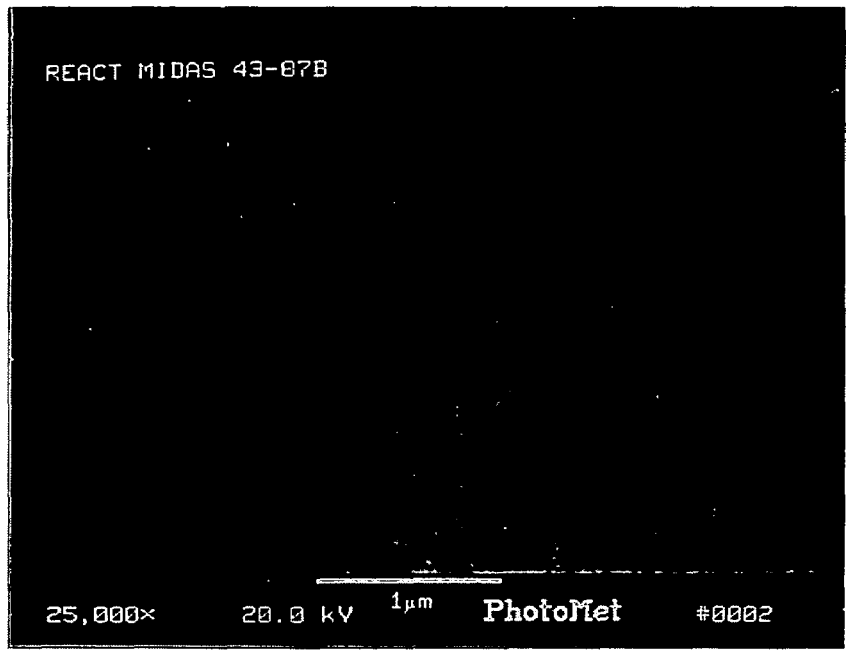
FIG. 2A is a 25,000×SEM photograph of an activated carbon, metal oxide filter element of the present invention.
Figure 2B:
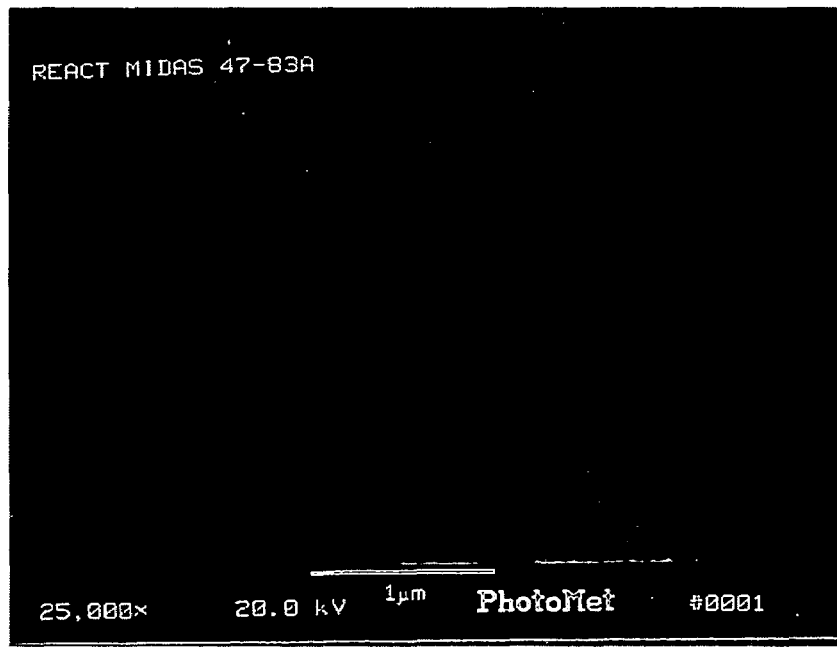
FIG. 2B is a 25,000×SEM photograph of another location of the activated carbon, metal oxide filter element of FIG. 2A.

FIG. 1 is a 15,000×SEM photograph of an activated carbon/metal oxide filter element of one embodiment of the present invention. The filter element comprises a fibrous binder of up to about 2 microns in length, and a number of fibers of about 0.5 to about 1.0 micron in length randomly positioned throughout the media. FIGS. 2A and 2B are 25,000×SEM photographs of an activated carbon/metal oxide filter element of the present invention, further illustrating the fibrous nature of the filter element. Without being bound by any particular theory, a fibrous shaped filler may form a web like net surrounding and binding the activated carbon and metal oxide while leaving voids to store sorbed compounds.

Figure 3A:
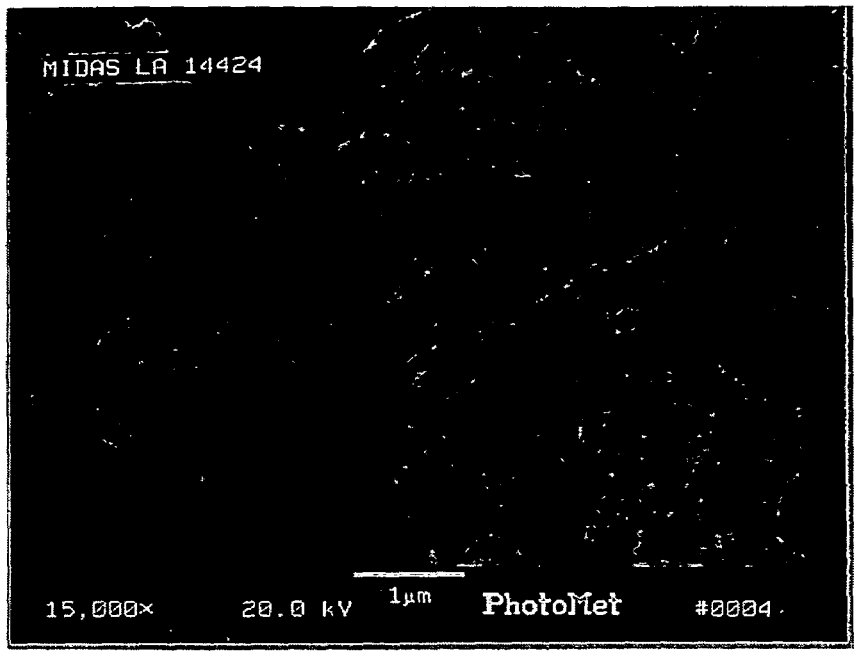
FIG. 3A is a 15,000×SEM photograph of an activated carbon/metal oxide matrix of the prior art.
Figure 3B:
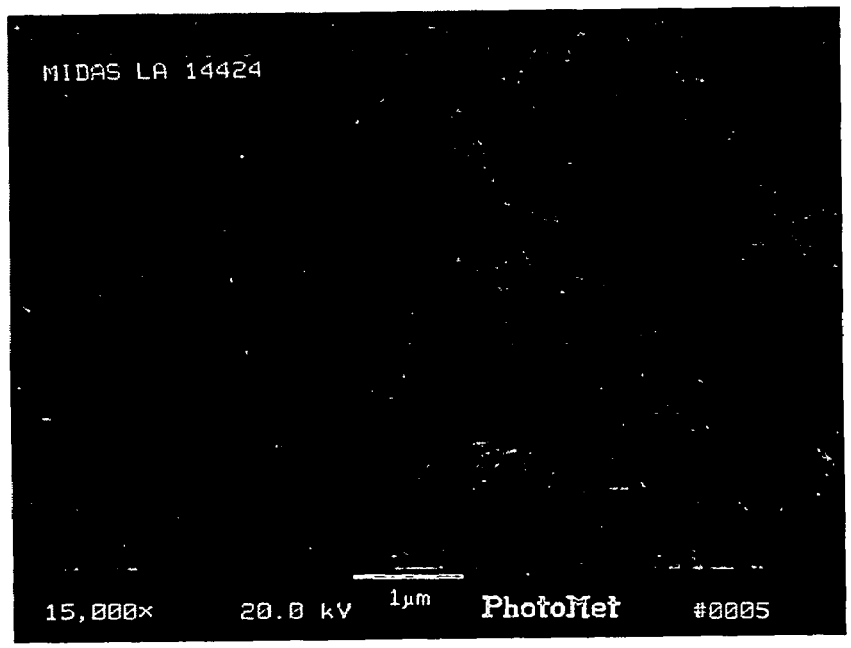
FIG. 3B is a 15,000×SEM photograph of another location of the activated carbon/metal oxide matrix of FIG. 3A.

In contrast to the present invention, FIGS. 3A and 3B are 15,000×SEM photographs of an activated carbon/metal oxide matrix produced by the method disclosed in U.S. Patent Application Publication No. 20020082168 and incorporated herein by reference in its entirety for all purposes. The carbon/metal oxide matrix formed by this method is an amorphous solid structure comprising larger carbon particles and smaller magnesium oxide particles.

In one embodiment of the invention, the activated carbon, metal oxide, and binder are mixed in the presence of a liquid to form a filter media mixture. In another embodiment, the binder and liquid are combined to form a slurry prior to mixing with the activated carbon and metal oxide. The liquid may be any suitable liquid capable of forming a slurry with the binder, and optionally of forming a paste with the activated carbon and metal oxide. The liquid may be aqueous or organic. In a preferred embodiment, the liquid is water. In one embodiment, the binder is insoluble, or substantially insoluble in the liquid. In a preferred embodiment, the binder, activated carbon, and metal oxide are insoluble or substantially insoluble in the liquid. In a preferred embodiment, the activated carbon and metal oxide are dry mixed prior to mixing with the binder slurry.

The activated carbon, metal oxide, and binder are blended to form a filter media mixture, and may subsequently be shaped into a filter body having any shape suitable for a particular purpose. For example, the filter media mixture may be extruded into strand, ribbons, or pellets. Extruders, such as high pressure hydraulic extruders, are known in the art. In a preferred embodiment, the filter media mixture is extruded into strands, about 6 mm to about 8 mm long, having a diameter of about 4 mm. The extrudate may re-extruded to form a second extrudate prior to further processing. In another embodiment, the second extrudate may be re-extruded to from a third extrudate. The filter body may be calcined to form the filter element, for example, at a temperature of about 300° C.

In another embodiment, the filter body may be dried to form a filter element having a moisture content sufficient to contribute to a chemical reaction at and/or near the surface of the filter element resulting in sorption of at least one reaction product by the filter element. As used herein, the term "contribute" is defined as "to initiate or otherwise participate in the chemical reaction." It has been found that a moisture content of between about 5 weight percent and about 15 weight percent is sufficient to contribute to the chemical reaction. It is understood that the moisture content may be higher or lower than this range and contribute to the chemical reaction. In a preferred embodiment, the filter element has a moisture content of about 10 weight percent. The moisture content of the filter element may be measured according to ASTM International Test Method D2867-99 Standard Test Methods for Moisture in Activated Carbon.

The filter body may be dried at any temperature and period of time sufficient to remove moisture without affecting the structure of the filter body. The filter body may be dried at a temperature less than that at which calcination occurs, for example, less than about 250° C., for a period of time sufficient to dry the filter element to a desired moisture content. In one embodiment, it has been found to be efficient to dry the filter body at about 110° C. until its moisture content is reduced to a desired level.

The activated carbon/metal oxide filter element may be used to sorb odors from a wide variety of sources, including: municipal, industrial and residential sources. For example, the activated filter element of the invention is suitable for sorbing odorous compounds typical of chemical processes found in sewage treatment plants, refineries, and pulp and paper mills. The filter element may also be used to remove odorous compounds from a gas or gaseous stream containing volatile organic compounds, such as, for example aldehydes and ketones, and/or acidic gases such as, for example, butyric acid, hydrogen chloride and sulfur dioxide.

Typical gases that may be purified by contact with the filter element include, but are not limited to, air, nitrogen and carbon dioxide. Moisture may also be present in the gas so long as it does not condense on the activated carbon/metal oxide matrix. In one embodiment, the gas has a moisture content of about 60% to about 95% RH. The gas to be purified may also contain oxygen. For example, the filter element of the invention typically oxidizes hydrogen sulfide in the following exothermic reaction.

$$2H_2S + O_2 \rightarrow 2H_2O + 2S$$

The filter element reduces hydrogen sulfide concentrations to below odor threshold levels by catalyticaly oxidizing the hydrogen sulfide to mainly elemental sulfur. Because the filter element may oxidize hydrogen sulfide to primarily elemental sulfur instead of sulfuric acid as is the case with most odor control media, the filter element has an unexpectedly high capacity for the removal of hydrogen sulfide. In contrast to the filter element of one embodiment of the present invention, other odor control media oxidize hydrogen sulfide to sulfuric acid, which because it is physically larger than elemental sulfur, fills the storage capacity of the odor control media more rapidly than sulfur.

Typical industrial uses may include packing a bed or column with the filter element of the present invention. For example, packed beds used in sewage treatment facilities range from about 3 feet to about 12 feet in diameter, and about 4 feet to about 6 feet in depth with a typical gas velocity through the bed of about 20 fpm to about 80 fpm. In a preferred embodiment, the gas velocity is about 60 fpm. The filter element may be operated at any pressure to meet throughput and at any temperature below the ignition temperature of carbon.

Sewage treatment plants produce sewage gas containing hydrogen sulfide and other organic sulfides that cause it to be malodorous. In addition, most chemical compounds that cause odors in sewage gas are toxic and corrosive. Examples of sulfur-containing substances known to cause an odor in sewage gas, are, allyl mercaptan, amyl mercaptan, benzyl mercaptan, croyti mercaptan, dimethyl sulfide, ethyl mercaptan, hydrogen sulfide, methyl mercaptan, and sulfur dioxide, among others. The filter element efficiently oxidizes mercaptans to their respective disulfides making them more adsorbable by the filter element.

Hydrogen sulfide, generally the major component of sewage gas, present at relatively high concentrations, is used as a measure of the odor intensity and corrosiveness of sewage gas. In addition to causing an intense odor associated with rotten eggs, hydrogen sulfide may be quite hazardous, causing physiological effects. A hydrogen sulfide concentration of about 0.1 ppm of sewage gas can be detected by the human nose, which although unpleasant, may be relatively harmless. However, as the concentration of hydrogen sulfide increases, various physical effects to exposure may be, for example, headache, nausea, and throat and eye irritation. At a hydrogen sulfide concentration of about 500 ppm of sewage gas, life threatening effects will occur, such as pulmonary edema, nervous system stimulation and apnea. Exposure to a hydrogen sulfide concentration of about 1,000 ppm to about 2,000 ppm of sewage gas may result in respiratory collapse, paralysis, and death.

The ability of a filter element to sorb hydrogen sulfide is reported in grams of hydrogen sulfide adsorbed per cubic centimeter of carbon, also known as the hydrogen sulfide breakthrough capacity. The hydrogen sulfide breakthrough capacity is determined by passing a moist (about 85% RH) stream of air containing 1 vol. % hydrogen sulfide through a one-inch diameter tube with a 9-inch deep bed of closely packed carbon at a rate of 1450 cc/min. The stream is monitored to a 50 ppmv hydrogen sulfide breakthrough. The activated carbon-metal oxide filter element has a hydrogen sulfide breakthrough capacity of about 0.20 to about 0.35 $gH_2S/ccC$ as illustrated in the following Examples.

EXAMPLES

The invention may be further understood with reference to the following examples, which is intended to serve as illustration only, and not as a limitation of the present invention as defined in the claims herein.

Example I

An activated carbon/metal oxide filter element was prepared by dry blending 22 grams of powdered activated carbon and 40 grams of Magnesium Oxide powder. The powdered activated carbon was obtained from Parker Bag House Fines under BHRS-PC-2. The magnesium oxide powder comprised 96% magnesium oxide. In addition, 27 grams of magnesium aluminosilicate was mixed in 325 cc of water with sufficient shear to produce a well dispersed slurry. The powdered activated carbon and magnesium oxide mixture was blended with the slurry to produce a heavy dough. The dough was extruded through a 3.7–4 mm die to form an extrudate. The extrudate was remixed and extruded again to form a second extrudate. The second extrudate was extruded to form a third extrudate. The third extrudate was allowed to air dry overnight followed by oven drying at 150° C. for about 3 hours. The dried third extrudate was calcined at about 300° C. for about 1.5 hours. The activated carbon, metal oxide filter element has a hydrogen sulfide breakthrough capacity of about 0.27 to about 0.35 g$H_2$S/ccC.

Example II

A reactivated carbon from the US Filter Red Bluff Reactivation Facility, having a mesh of 8×30 and identified as ACNS, was ground to a fine powder (>90%—325 mesh). The powdered reactivated carbon was physically blended with a magnesium oxide powder and a slurry of magnesium aluminosilicate to form a filter media mixture. The filter media mixture was extruded to form a filter body. The filter body was partially dried in an oven having a temperature of about 110° C. to form a filter element. The final moisture content of the filter element was about 10 wt. %. The filter element possessed good physical properties and had a hydrogen sulfide breakthrough capacity of about 0.20 to about 0.30 g$H_2$S/ccC.

Surprisingly, in many situations the activated carbon/metal oxide filter element may exhibit a structural failure when it is fully saturated with hydrogen sulfide. "Exhibiting a structural failure" is used herein as anything that alters the structure of the filter element, a loss of any part of the filter element. A structural failure may include, but is not limited to, a crack, a chip, partial or complete crumbling, or combinations thereof. As used herein, the phrase "saturated" is defined as sorbing all or nearly all of a compound or element that is possible. Without being bound by any particular theory, it is believed that sulfur crystals formed on or within the pore structure of the filter element push the filter element apart, and acts as a visual indicator that the filter element has reached or nearly reached the end of its useful life. Other visual indicators of the end of the filter element's useful life are contemplated, including, but not limited to other structural changes as well as color changes.

Those skilled in the art will readily appreciate that all parameters listed herein are meant to be exemplary and actual parameters depend upon the specific application for which the methods and materials of the present invention are used. It is, therefore, to be understood that the foregoing embodiments are presented by way of example only and that, within the scope of the appended claims and equivalents thereto, the invention can be practiced otherwise than as specifically described.

While several embodiments of the invention have been described and illustrated herein, those of ordinary skill in the art will readily envision a variety of other means and structures for performing the functions and/or obtaining the results or advantages described herein, and each of such variations or modifications is deemed to be within the scope of the present invention. More generally, those skilled in the art would readily appreciate that all parameters, dimensions, materials, and configurations described herein are meant to be exemplary and that actual parameters, dimensions, materials, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention.

In the claims (as well as in the specification above), all transitional phrases such as "comprising," "including," "carrying," "having," "containing," "involving," and the like are to be understood to be open-ended, i.e. to mean including but not limited to. Only the transitional phrases "consisting of" and "consisting essentially of" shall be closed or semi-closed transitional phrases, respectively, as set forth in the United States Patent Office Manual of Patent Examining Procedures, section 2111.03.

What is claimed is:

1. A method for preparing a filter element comprising:
    blending an activated carbon, a metal oxide, and a binder to form a filter media mixture;
    shaping the filter media mixture into a filter body; and
    calcining the filter body to form a filter element.

2. The method of claim 1, further comprising mixing a solvent with the binder to form a slurry prior to blending the activated carbon and metal oxide.

3. The method of claim 2, further comprising dry blending the activated carbon and metal oxide.

4. The method of claim 2, wherein the binder is magnesium aluminosilicate.

5. The method of claim 2, wherein the binder is silica sol.

6. The method of claim 2, wherein the binder is alumina sol.

7. The method of claim 3, wherein shaping the filter media mixture comprises extruding the filter media mixture to form a first extrudate.

8. The method of claim 7, further comprising extruding the first extrudate to form a second extrudate.

9. The method of claim 8, further comprising extruding the second extrudate to form a third extrudate.

10. The method of claim 2, wherein the solvent is water.

11. The method of claim 8, wherein the filter body is calcined at about 300° C.

12. The method of claim 11, wherein the activated carbon is a granulated activated carbon.

13. The method of claim 11, wherein the activated carbon is a powdered activated carbon.

14. The method of claim 11, wherein the activated carbon is a reactivated activated carbon.

15. The method of claim 13, wherein the metal oxide is magnesium oxide.

16. The method of claim 13, wherein the metal oxide is calcium oxide.

17. The method of claim 13, wherein the metal oxide is barium oxide.

18. The method of claim 3, further comprising calcining the metal oxide prior to blending with the activated carbon and the binder.

19. The method of claim 18, wherein the metal oxide is high density metal oxide.

20. The method of claim 3, wherein the metal oxide is a powder.

21. The method of claim 20, wherein the metal oxide is about 3% to about 15%, by weight, of the filter media mixture.

22. The method of claim 21, wherein the metal oxide is about 5% to about 10%, by weight, of the filter media mixture.

23. The method of claim 22, wherein the binder is about 10%, by weight, of the filter media mixture.

24. The method of claim 2, wherein the binder is a fiber with an aspect ratio of between about 500:1 and about 700:1.

25. A method for reducing a concentration of an odorous compound in a gaseous stream comprising:
forming an activated carbon/metal oxide filter element, wherein the filter element is constructed and arranged to exhibit a structural failure when saturated with the odorous compound;
contacting the gaseous stream with the filter element such that the odorous compound is sorbed on the filter element to purify the gaseous stream; and
removing the purified gaseous stream from the filter element.

26. The method of claim 25, wherein forming the activated carbon/metal oxide filter element comprises blending an activated carbon, a metal oxide, a binder.

27. The method of claim 26, wherein forming the activated carbon/metal oxide filter element further comprises shaping the filter media mixture into a filter body.

28. The method of claim 27, wherein forming the activated carbon/metal oxide filter element further comprises calcining the filter body.

29. The method of claim 26, wherein the metal oxide is magnesium oxide.

30. The method of claim 29, wherein the metal oxide is calcined.

31. The method of claim 26, wherein blending an activated carbon, a metal oxide, and a binder comprises mixing a solvent with a binder to form a slurry prior to blending the activated carbon and metal oxide.

32. The method of claim 31, wherein activated carbon and metal oxide are dry blended.

33. The method of claim 31, wherein the binder is magnesium alumino silicate.

34. The method of claim 33, wherein the binder has a fiber with an aspect ratio of about 500:1 to about 700:1.

35. The method of claim 31, wherein the activated carbon is a powdered activated carbon.

36. The method of claim 32, wherein the activated carbon is a reactivated activated carbon.

37. A method for reducing a concentration of hydrogen sulfide present in a gaseous discharge comprising:
contacting the gaseous discharge with an activated carbon-metal oxide filter element, wherein the filter element is constructed and arranged to exhibit a structural failure when saturated with sulfur, thereby producing a product stream having a reduced hydrogen sulfide concentration; and
removing the product stream from the activated carbon/metal oxide filter element.

38. The method of claim 37, wherein the metal oxide is magnesium oxide.

39. The method of claim 38, wherein the metal oxide is calcined.

40. The method of claim 38, wherein the filter element comprises a binder.

41. The method of claim 40, wherein the binder is magnesium aluminosilicate.

42. The method of claim 40, wherein the binder has a fibrous aspect ratio of between about 500:1 and about 700:1.

43. The method of claim 37, wherein the activated carbon is a powdered activated carbon.

44. The method of claim 37, wherein the activated carbon is a reactivated activated carbon.

45. A filter media comprising:
an activated carbon;
a metal oxide; and
a fibrous binder having an aspect ratio of between and including about 500:1 and about 700:1.

46. The filter media of claim 45, wherein the activated carbon is a reactivated activated carbon.

47. The filter media of claim 45 wherein the binder is magnesium aluminosilicate.

48. The filter media of claim 45, wherein the metal oxide is magnesium oxide.

49. The filter media of claim 45, further comprising a hydrogen sulfide breakthrough capacity of at least about 0.27 $gH_2S/ccC$.

50. The filter media of claim 45, further comprising a moisture content of about 5 weight percent to about 15 weight percent.

51. The filter media of claim 50, further comprising a moisture content of about 10 weight percent.

52. A method for preparing a filter element comprising:
blending an activated carbon, metal oxide, and binder to form a filter media mixture;
shaping the filter media mixture to form a filter body;
drying the filter body to form a filter element having a moisture content of about 5 weight percent to about 15 weight percent.

53. The method of claim 52, wherein the filter element has a moisture content of about 10 weight percent.

54. The method of claim 52, further comprising mixing a solvent with the binder to form a slurry prior to blending the activated carbon and metal oxide.

55. The method of claim 54, further comprising dry blending the activated carbon and metal oxide.

56. The method of claim 55, wherein the binder is magnesium aluminosilicate.

* * * * *